(12) United States Patent
Nagata et al.

(10) Patent No.: US 11,247,740 B2
(45) Date of Patent: Feb. 15, 2022

(54) VEHICLE

(71) Applicant: TOYOTA JIDOSHA KABUSHIKI KAISHA, Toyota (JP)

(72) Inventors: Ryosuke Nagata, Toyota (JP); Hiroaki Kosaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 16/538,364

(22) Filed: Aug. 12, 2019

(65) Prior Publication Data

US 2020/0102031 A1  Apr. 2, 2020

(30) Foreign Application Priority Data

Sep. 27, 2018 (JP) .............................. JP2018-182111
Feb. 8, 2019 (JP) .............................. JP2019-021532

(51) Int. Cl.
  *B62D 65/16*  (2006.01)
  *B62D 21/15*  (2006.01)
  *F01N 13/08*  (2010.01)

(52) U.S. Cl.
  CPC ........... *B62D 65/16* (2013.01); *B62D 21/152* (2013.01); *F01N 13/08* (2013.01)

(58) Field of Classification Search
  CPC ..... B62D 65/16; B62D 21/152; F01N 11/002; F01N 13/08
  See application file for complete search history.

(56) References Cited

U.S. PATENT DOCUMENTS

2004/0031386 A1 * 2/2004 Rauchfuss ........... G01N 29/326
                                                                    95/1

FOREIGN PATENT DOCUMENTS

| DE | 102005006944 A1 * | 8/2006 | ............... B60K 5/12 |
| JP | H09-032543 A | 2/1997 | |
| JP | 2008-095527 A | 4/2008 | |
| JP | 6296120 B2 * | 3/2018 | |

* cited by examiner

*Primary Examiner* — Lori L Lyjak
(74) *Attorney, Agent, or Firm* — Oliff PLC (57) ABSTRACT

A vehicle includes a fragile portion provided in an exhaust passage at a position frontward of a dashboard panel in a vehicle front-rear direction, and a thrusting portion. The fragile portion fractures more easily under a force from a front side of the vehicle than other portions of the exhaust passage. The thrusting portion is provided in one of the exhaust passage, at a position frontward of the dashboard panel and rearward of the fragile portion in the vehicle front-rear direction, and a framework member that is part of a frame structure of the vehicle and supports the dashboard panel. The thrusting portion protrudes from the one of the exhaust passage and the framework member toward the other one and facing the other one in the vehicle front-rear direction.

8 Claims, 6 Drawing Sheets

VEHICLE

INCORPORATION BY REFERENCE

The disclosure of Japanese Patent Application No. 2019-021532 filed on Feb. 8, 2019 including the specification, drawings and abstract is incorporated herein by reference in its entirety.

BACKGROUND

1. Technical Field

The present disclosure relates to a vehicle.

2. Description of Related Art

The vehicle of Japanese Patent Application Publication No. 2008-095527 (JP 2008-095527 A) is partitioned in the vehicle front-rear direction by a dashboard panel into a vehicle cabin intended for occupants of the vehicle etc. and an engine compartment in which an internal combustion engine etc. are installed. An exhaust passage extending from the internal combustion engine toward the rear side of the vehicle is fixed to the internal combustion engine. The exhaust passage leads to the rear side of the vehicle by passing under the dashboard panel and the vehicle cabin. At a front-side portion of the exhaust passage, a fragile portion is provided that has lower impact strength than other portions of the exhaust passage.

In the vehicle of JP 2008-095527 A, the engine compartment becomes crushed and the internal combustion engine moves rearward at a frontal collision in which an object collides with the vehicle from the front side. Then, the exhaust passage fractures at the fragile portion and falls downward from the internal combustion engine. As the exhaust passage thus falls, a space is created between the internal combustion engine etc. and the dashboard panel, securing a crash stroke for absorbing the impact force of the collision.

SUMMARY

In the vehicle of JP 2008-095527 A, a collision load acting on the internal combustion engine or the exhaust passage at a frontal collision is not sufficiently transferred to the fragile portion of the exhaust passage, depending on the amount and direction of the load, so that the exhaust passage may fail to fracture as intended. Thus, the vehicle of JP 2008-095527 A needs a structure that allows the exhaust passage to fracture more reliably at a frontal collision of the vehicle.

A vehicle of the present disclosure includes; a plate-shaped dashboard panel serving as a partition between an engine compartment in which an internal combustion engine is installed and a vehicle cabin located rearward of the engine compartment in a vehicle front-rear direction; and a first exhaust passage fixed to the internal combustion engine and extending from the internal combustion engine toward the rear side of the vehicle. The first exhaust passage has a fragile portion provided at a position frontward of the dashboard panel in the vehicle front-rear direction. The fragile portion fractures more easily under a force from the front side of the vehicle than other portions of the first exhaust passage. The vehicle further includes a thrusting portion provided in one of the first exhaust passage, at a position frontward of the dashboard panel and rearward of the fragile portion in the vehicle front-rear direction, and a framework member that is part of a frame structure of the vehicle and supports the dashboard panel. The thrusting portion protrudes from the one of the first exhaust passage and the framework member toward the other one and faces the other one in the vehicle front-rear direction.

In this configuration, when the internal combustion engine moves toward the rear side of the vehicle, the first exhaust passage and the framework member are highly likely to come into contact with each other through the thrusting portion, compared with a configuration that does not include the thrusting portion. By coming into contact with the framework member, the first exhaust passage is restrained from moving further toward the rear side of the vehicle, so that a force with which the first exhaust passage tries to move rearward is likely to act on the fragile portion of the first exhaust passage. Thus, at a collision of the vehicle, the first exhaust passage is allowed to fracture at the fragile portion more reliably so as to fall.

In the above configuration, a thrust-receiving portion with which the thrusting portion comes into contact when the first exhaust passage moves toward the rear side of the vehicle may be provided in the other one of the first exhaust passage, at a position frontward of the dashboard panel and rearward of the fragile portion in the vehicle front-rear direction, and the framework member. Inside the engine compartment, the distance in the vehicle front-rear direction between the thrusting portion and the thrust-receiving portion may be equal to or shorter than the shortest distance in the vehicle front-rear direction between the dashboard panel and a portion of the first exhaust passage that faces the dashboard panel in the vehicle front-rear direction.

In this configuration, the thrusting portion and the thrust-receiving portion are especially highly likely to come into contact with each other when the internal combustion engine moves toward the rear side of the vehicle. Accordingly, the force with which the first exhaust passage tries to move rearward can be more reliably exerted on the fragile portion of the first exhaust passage as the thrusting portion and the thrust-receiving portion come into contact with each other.

The above configuration may further include a second exhaust passage. The first exhaust passage may be located on one side in a vehicle width direction and the second exhaust passage may be located on the other side in the vehicle width direction. The second exhaust passage may be fixed to the internal combustion engine and extend from the internal combustion engine toward the rear side of the vehicle. Inside the engine compartment, the distance in the vehicle front-rear direction between the thrusting portion and the thrust-receiving portion may be shorter than the shortest distance in the vehicle front-rear direction between the dashboard panel and a portion of the second exhaust passage that faces the dashboard panel in the vehicle front-rear direction.

In this configuration, when the internal combustion engine moves toward the rear side of the vehicle, the second exhaust passage is highly likely to come into contact with the dashboard panel etc. after the thrusting portion comes into contact with the thrust-receiving portion. In other words, this configuration allows the first exhaust passage to come into contact with the framework member and the second exhaust passage to come into contact with the dashboard panel etc. at different timings. When the first exhaust passage and the second exhaust passage thus come into contact with the framework member etc. at different timings, a maximum impact force exerted on the vehicle by the first exhaust passage and the second exhaust passage coming into contact with the framework member etc. can be reduced compared with when these timings are the same.

In the above configuration, a portion at which the first exhaust passage is fixed to the internal combustion engine may be located rearward in the vehicle front-rear direction of a portion at which the second exhaust passage is fixed to the internal combustion engine. In this configuration, a space between the internal combustion engine and the dashboard panel in the vehicle front-rear direction tends to be smaller on the side where the first exhaust passage is disposed than on the side where the second exhaust passage is disposed. In such a configuration, employing a structure involving the thrusting portion on the first exhaust passage side is extremely favorable in securing a space between the internal combustion engine and the dashboard panel by allowing the first exhaust passage to fall.

The above configuration may further include a steering wheel which is mounted inside the vehicle cabin and by which the vehicle is steered. In a plan view of the vehicle, the distance in a vehicle width direction between the center of turning of the steering wheel and the first exhaust passage may be shorter than the distance in the vehicle width direction between the center of turning of the steering wheel and the second exhaust passage.

This configuration allows the first exhaust passage to fall more reliably, and can thereby reduce the likelihood that the first exhaust passage may come into contact with a portion of the dashboard panel in the vicinity of the steering wheel. Accordingly, this configuration can more reliably reduce damage to the steering wheel and a surrounding structure resulting from deformation of the portion of the dashboard panel in the vicinity of the steering wheel.

In the above configuration, the first exhaust passage may include an upstream-side exhaust pipe located on an upstream side, a downstream-side exhaust pipe located on a downstream side, and a ring-shaped clamp member that fixes a downstream end of the upstream-side exhaust pipe and an upstream end of the downstream-side exhaust pipe to each other in a state of being coupled together. The thrusting portion may be located below the clamp member in a vehicle height direction. The clamp member may include a half-ring-shaped first fixing part, a half-ring-shaped second fixing part, a turning part that turnably couples together the first fixing part and the second fixing part at ends on one side, and a fastening part that fastens together the first fixing part and the second fixing part at ends on the other side by screw fastening. The turning part may be located above the fastening part in the vehicle height direction. The fragile portion may be a portion at which the downstream end of the upstream-side exhaust pipe and the upstream end of the downstream-side exhaust pipe are fixed to each other.

In this configuration, the fastening part of the clamp member is fastened with a screw and has high strength, while the turning part has a structure that enables the first fixing part and the second fixing part to turn and therefore has low strength and breaks easily. When the thrusting portion comes into contact with the thrust-receiving portion, the upper side of the portion at which the downstream end of the upstream-side exhaust pipe and the upstream end of the downstream-side exhaust pipe are fixed to each other is subjected to a force that tries to separate these exhaust pipes from each other. Since the turning part of the clamp member is located on the upper side that is subjected to such a force in this configuration, the downstream-side exhaust pipe is allowed to fall from the upstream-side exhaust pipe as the clamp member breaks.

In the above configuration, a catalytic converter that reduces pollutants in exhaust gas may be mounted inside the first exhaust passage, at a position frontward of the dashboard panel and rearward of the fragile portion.

In this configuration, the portion at which the catalytic converter is mounted is heavier than other portions of the first exhaust passage. Thus, when the exhaust passage fractures at the fragile portion, the first exhaust passage is allowed to fall easily due to the weight of the catalytic converter.

In the above configuration, the thrusting portion may be a plate-shaped member having a curved or bent shape in cross section orthogonal to the vehicle front-rear direction. In this configuration, the thrusting portion has high rigidity against a force acting in the vehicle front-rear direction. Accordingly, such a force is hardly absorbed by deformation of the thrusting portion when the first exhaust passage and the framework member come into contact with each other through the thrusting portion. As a result, the force with which the first exhaust passage tries to move rearward can be more reliably exerted on the fragile portion of the first exhaust passage through the thrusting portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
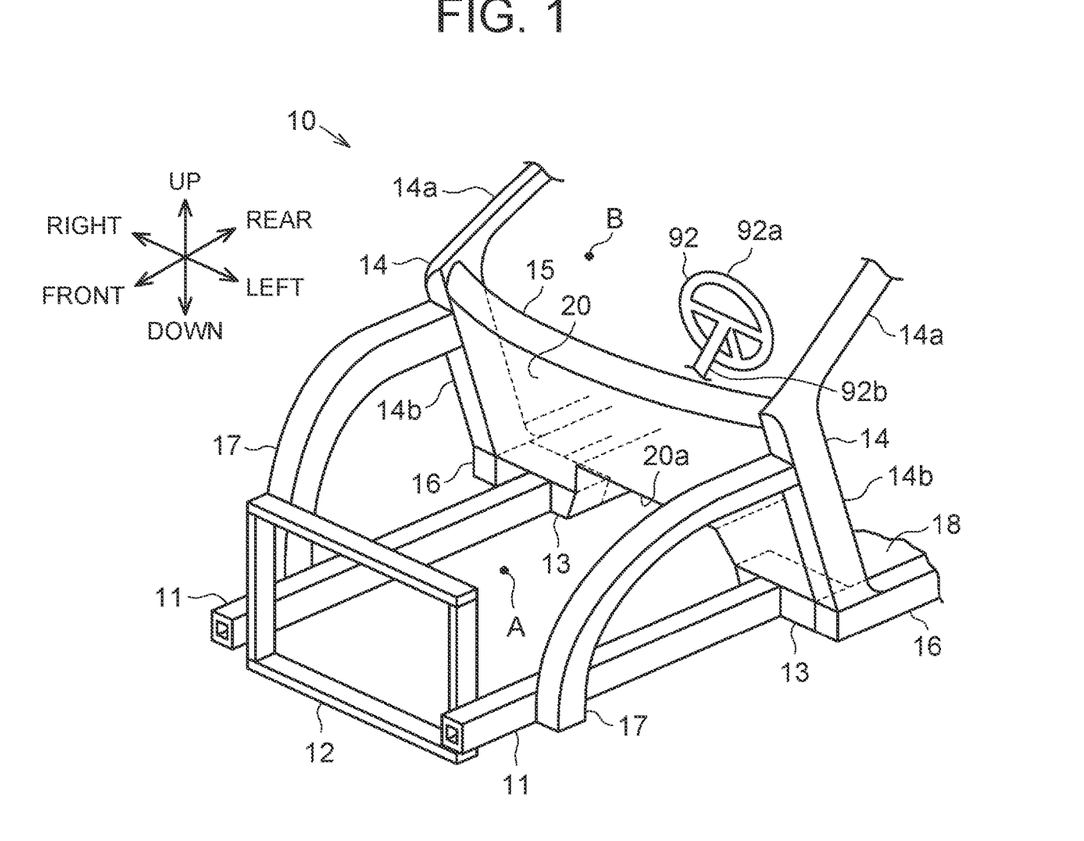
FIG. 1 is a perspective view of a front-side part of a vehicle.

An embodiment will be described below in accordance with the drawings. First, a frame structure 10 of a vehicle will be described. As shown in FIG. 1, front side members 11 extend in a vehicle front-rear direction in a part of the frame structure 10 on a front side of the vehicle. The pair of front side members 11 are disposed apart from each other in a vehicle width direction.

A substantially rectangular frame-shaped radiator support 12 is disposed between front end portions of the pair of front side members 11. Surfaces of the radiator support 12 on outer sides in the vehicle width direction are respectively fixed to surfaces of the front end portions of the front side members 11 on inner sides in the vehicle width direction. A radiator (not shown) that cools a coolant is fixed to the radiator support 12.

Lower cross members 13 extending in the vehicle width direction are connected to rear ends of the front side members 11. Each lower cross member 13 is connected to the rear end of the front side member 11, at a substantially central portion of the lower cross member 13 in an extension direction thereof. The lower cross members 13 are respectively connected to the pair of front side members 11. The pair of lower cross members 13 are disposed apart from each other in the vehicle width direction.

A rocker 16 extends toward a rear side of the vehicle from an end portion of each lower cross member 13 on the outer side in the vehicle width direction. The rockers 16 respectively extend from the pair of lower cross members 13. In FIG. 1, only part of each rocker 16 on the front side of the vehicle is shown. A lower pillar 14b extends from a front end portion of each rocker 16 toward an upper side of the vehicle. Specifically, the lower pillar 14b is slightly inclined toward the front side of the vehicle while extending toward the upper side of the vehicle. The lower pillars 14b respectively extend from the pair of rockers 16. An upper pillar 14a extends from an upper end of each lower pillar 14b toward the upper side of the vehicle. Specifically, the upper pillar 14a is inclined toward the rear side of the vehicle while extending toward the upper side of the vehicle. The upper pillars 14a respectively extend from the pair of lower pillars 14b. The lower pillar 14b and the upper pillar 14a constitute a front pillar 14 (A-pillar).

An upper cross member 15 extending in the vehicle width direction is disposed between upper end portions of the pair of lower pillars 14b. Ends of the upper cross member 15 on the outer sides in the vehicle width direction are fixed to surfaces of the lower pillars 14b on the inner sides in the vehicle width direction.

An apron upper member 17 extends roughly toward the front side of the vehicle from a portion of each lower pillar 14b above a central portion in an extension direction thereof. The apron upper member 17 is curved toward a lower side of the vehicle while extending toward the front side of the vehicle. A front end portion of each apron upper member 17 is fixed to a portion of the front side member 11 frontward of a central portion thereof in the vehicle front-rear direction.

A substantially rectangular plate-shaped dashboard panel 20 is disposed in a space surrounded by the lower cross members 13, the lower pillars 14b, and the upper cross member 15. Outer edges of the dashboard panel 20 are fixed to inner edges of the lower cross members 13, the lower pillars 14b, and the upper cross member 15. Thus, the dashboard panel 20 is supported by the lower cross members 13, the lower pillars 14b, and the upper cross member 15 that are framework members. The dashboard panel 20 partitions a space into an engine compartment A on the front side of the vehicle in which an internal combustion engine 30 is disposed and a vehicle cabin B located rearward of the engine compartment A in the vehicle front-rear direction. In FIG. 1, the internal combustion engine 30 is not shown.

The dashboard panel 20 is provided with a cutout 20a of such a shape as formed by cutting out, toward the upper side of the vehicle, a portion of a lower edge of the dashboard panel 20 located between the pair of lower cross members 13. When seen from the vehicle front-rear direction, edges of the cutout 20a have an inverted U-shape as a whole.

A plate-shaped floor panel 18 is disposed between the pair of rockers 16. Outer edges of the floor panel 18 are fixed to inner edges of the lower cross members 13, the rockers 16, and the dashboard panel 20. A central portion of the floor panel 18 in the vehicle width direction protrudes upward along the edges of the cutout 20a of the dashboard panel 20. Thus, a central portion of the dashboard panel 20 in the vehicle width direction forms a floor tunnel protruding upward.

A steering 92 by which the vehicle is steered is mounted inside the vehicle cabin B. Specifically, a steering wheel 92a of the steering 92 is disposed inside the vehicle cabin B, on a left side in the vehicle width direction. The steering wheel 92a is coupled to wheels (not shown) through a substantially rod-shaped steering shaft 92b. The steering wheel 92a can be manipulated to turn about the center of turning that is a portion at which the steering wheel 92a and the steering shaft 92b are coupled together.

Figure 2:
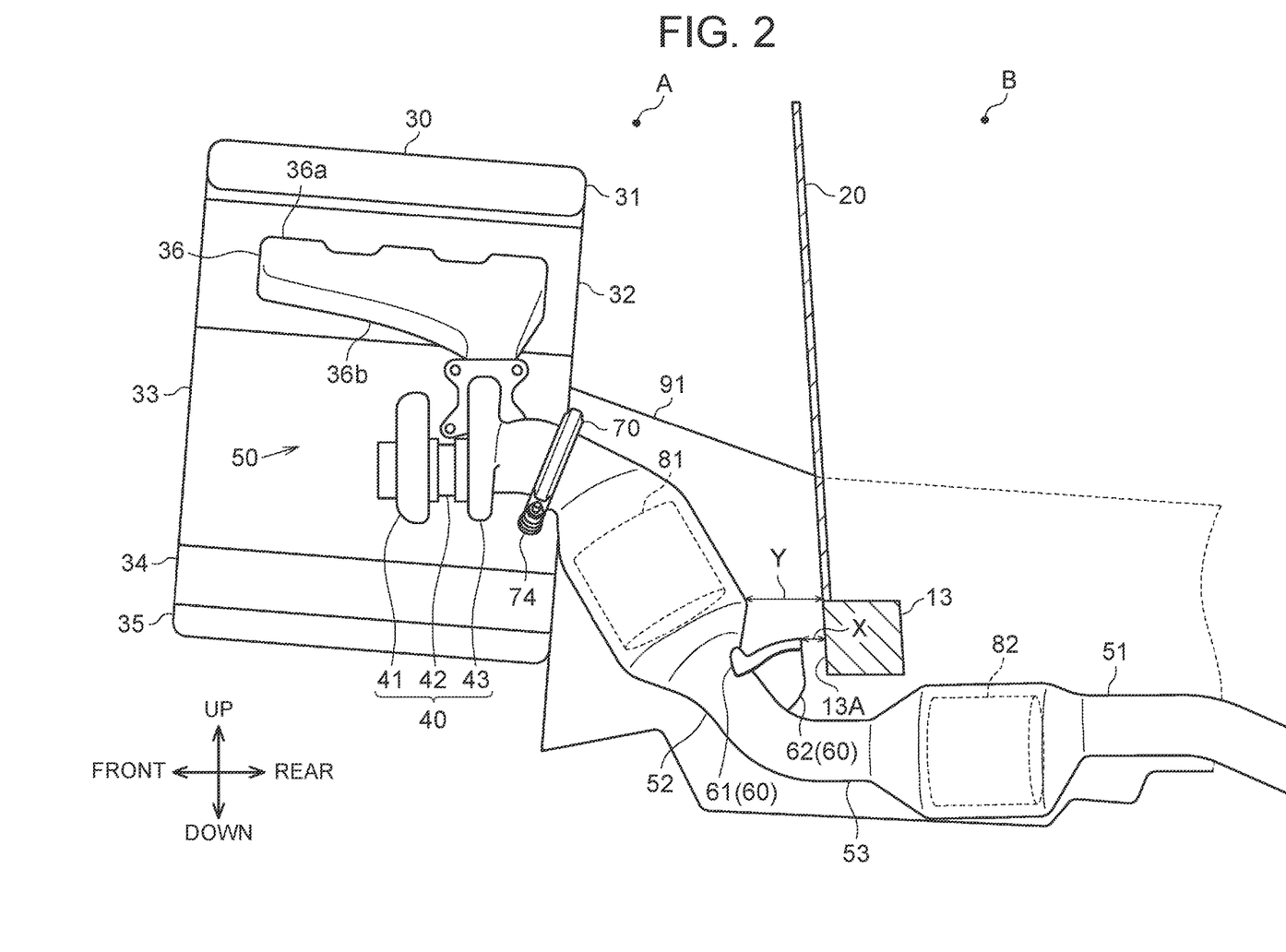
FIG. 2 is a side view of the front-side part of the vehicle.

Next, the internal combustion engine 30 inside the engine compartment A and an exhaust structure will be described. As shown in FIG. 2, the internal combustion engine 30 that is a V-engine for driving the vehicle is disposed inside the engine compartment A. The internal combustion engine 30 is disposed at such a position as to overlap the dashboard panel 20 when seen from the vehicle front-rear direction. Thus, the internal combustion engine 30 faces the dashboard panel 20 in the vehicle front-rear direction.

Figure 3:
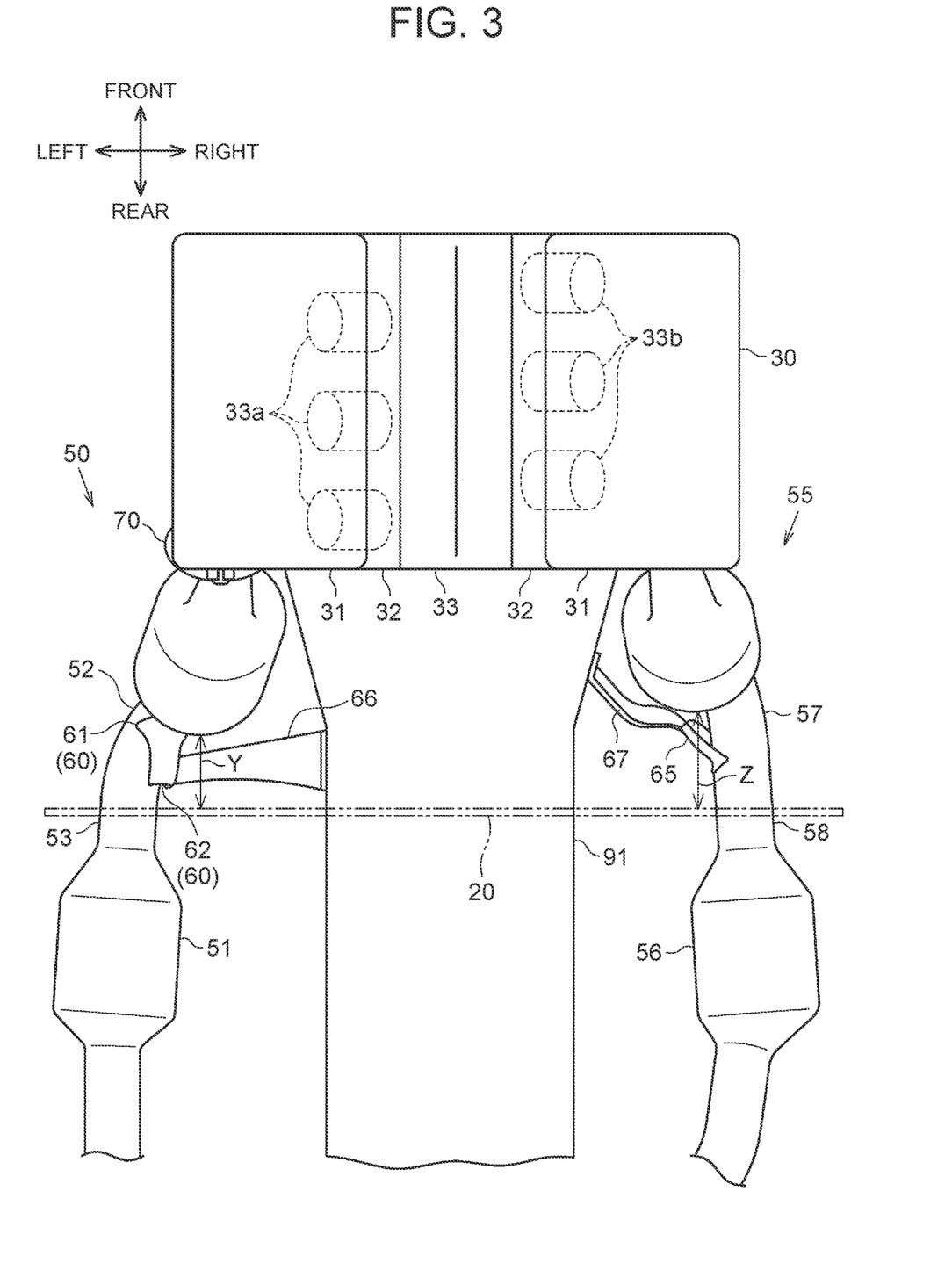
FIG. 3 is a plan view of the front-side part of the vehicle.

The internal combustion engine 30 includes a cylinder block 33 in which fuel is combusted. When seen from the vehicle front-rear direction, the cylinder block 33 has a V-shape as a whole. As shown in FIG. 3, three cylinders 33a are defined inside the cylinder block 33, on the left side in the vehicle width direction. The three cylinders 33a are arrayed in the vehicle front-rear direction. Three cylinders 33b are defined inside the cylinder block 33, on a right side in the vehicle width direction. The three cylinders 33b are arrayed in the vehicle front-rear direction. The rearmost cylinder 33a of the three cylinders 33a on the left side in the vehicle width direction is located rearward of the rearmost cylinder 33b of the three cylinders 33b on the right side in the vehicle width direction. In FIG. 3, the cylinders 33a and the cylinders 33b in the cylinder block 33 are imaginarily represented by dashed lines.

As shown in FIG. 2, a cylinder head 32 having a rectangular prism shape as a whole is fixed to the cylinder block 33 so as to cover the cylinders 33a from the upper side. An intake port (not shown) through which intake air is introduced into the cylinders 33a is defined inside the cylinder head 32. The intake port opens in an end surface of the cylinder head 32 on the inner side in the vehicle width direction. An exhaust port (not shown) through which exhaust gas is discharged from the cylinders 33a is defined inside the cylinder head 32. The exhaust port opens in an end surface of the cylinder head 32 on the outer side in the vehicle width direction. Similarly, a cylinder head 32 is fixed to the cylinder block 33 so as to cover the cylinders 33b from the upper side. A head cover 31 that covers an upper surface of the cylinder head 32 is fixed to the upper surface of each cylinder head 32.

A crankcase 34 having a rectangular box shape as a whole is fixed to a lower surface of the cylinder block 33. A crankshaft (not shown) is rotatably supported between the cylinder block 33 and the crankcase 34. An axial direction of the crankshaft extends along the vehicle front-rear direction. An oil pan 35 in the shape of a box having a bottom is fixed to a lower surface of the crankcase 34. Engine oil is stored inside the oil pan 35. A transmission 91 is disposed rearward of the internal combustion engine 30 in the vehicle front-rear direction. The transmission 91 is drivably coupled to the crankshaft. As shown in FIG. 3, the transmission 91 extends from the internal combustion engine 30 toward the rear side of the vehicle.

An intake manifold (not shown) through which intake air is introduced into the cylinder head 32 is fixed to an end surface of each cylinder head 32 on the inner side in the vehicle width direction. A space inside the intake manifold communicates with the intake port of the cylinder head 32.

As shown in FIG. 2, an exhaust manifold 36 through which exhaust gas is discharged from the cylinder head 32 is fixed to an end surface of each cylinder head 32 on the outer side in the vehicle width direction. A space inside the exhaust manifold 36 communicates with the exhaust port of the cylinder head 32. An upstream-side portion of the exhaust manifold 36 branches into three tubular branch pipes 36a, which merge into one collecting pipe 36b at a downstream-side portion of the exhaust manifold 36. The branch pipes 36a extend roughly toward the outer side in the vehicle width direction. The collecting pipe 36b is curved toward the lower side of the vehicle while extending toward the downstream side. The shape of the exhaust manifold 36 on the left side in the vehicle width direction and the shape of the exhaust manifold 36 on the right side in the vehicle width direction are symmetrical in the vehicle width direction. As described above, the rearmost cylinder 33a of the three cylinders 33a on the left side in the vehicle width direction is located rearward of the rearmost cylinder 33b of the three cylinders 33b on the right side in the vehicle width direction. Accordingly, the exhaust manifold 36 on the left side in the vehicle width direction corresponding to the cylinders 33a on the left side in the vehicle width direction is located rearward of the exhaust manifold 36 on the right side in the vehicle width direction corresponding to the cylinders 33b on the right side in the vehicle width direction.

A turbocharger 40 that compresses intake air through a flow of exhaust gas is fixed to a downstream end of the collecting pipe 36b of each exhaust manifold 36. The turbocharger 40 has a structure in which a turbine section 43 where a turbine is rotated by a flow of exhaust gas and a compressor section 41 where intake air is compressed as the turbine rotates are coupled together by a bearing section 42. The turbine section 43 of the turbocharger 40 is connected to a downstream end of the collecting pipe 36b of the exhaust manifold 36. As described above, the exhaust manifold 36 on the left side in the vehicle width direction corresponding to the cylinders 33a on the left side in the vehicle width direction is located rearward of the exhaust manifold 36 on the right side in the vehicle width direction corresponding to the cylinders 33b on the right side in the vehicle width direction. Accordingly, the turbine section 43 fixed to the exhaust manifold 36 on the left side in the vehicle width direction is located rearward of the turbine section 43 fixed to the exhaust manifold 36 on the right side in the vehicle width direction. The turbocharger 40 is fixed also to the internal combustion engine 30.

A cylindrical first exhaust pipe 51 through which exhaust gas flows is fixed to a downstream end of the turbine section 43 of the turbocharger 40 on the left side in the vehicle width direction. The first exhaust pipe 51 can be broadly divided into an upstream pipe 52 located on the upstream side and a downstream pipe 53 located on the downstream side. The upstream pipe 52 extends obliquely from the turbocharger 40 toward the lower side while extending toward the rear side of the vehicle. A downstream end of the upstream pipe 52 is located slightly frontward of the lower cross member 13 in the vehicle front-rear direction and below the lower cross member 13 in the vehicle height direction. The downstream pipe 53 extends from the downstream end of the upstream pipe 52 toward the rear side of the vehicle.

As shown in FIG. 3, a second exhaust pipe 56 through which exhaust gas flows is fixed to a downstream end of the turbine section 43 on the right side in the vehicle width direction. The second exhaust pipe 56 has a shape symmetrical with the shape of the first exhaust pipe 51 in the vehicle width direction, and is composed of an upstream pipe 57 and a downstream pipe 58.

As described above, the turbine section 43 fixed to the exhaust manifold 36 on the left side in the vehicle width direction is located rearward of the turbine section 43 fixed to the exhaust manifold 36 on the right side in the vehicle width direction. Accordingly, a portion at which the first exhaust pipe 51 and the turbine section 43 on the left side in the vehicle width direction are fixed to each other is located rearward of a portion at which the second exhaust pipe 56 and the turbine section 43 on the right side in the vehicle width direction are fixed to each other. The shape of the second exhaust pipe 56 is symmetrical with the shape of the first exhaust pipe 51 in the vehicle width direction, and is the same as the shape of the first exhaust pipe 51 when seen from the vehicle width direction. Thus, the first exhaust pipe 51 is so disposed as to look like the second exhaust pipe 56 having been moved parallel toward the rear side of the vehicle when seen from the vehicle width direction.

As shown in FIG. 2, a catalytic converter 81 that reduces pollutants in exhaust gas is mounted inside the upstream pipe 52 of the first exhaust pipe 51. The catalytic converter 81 is located at a substantially central portion of the upstream pipe 52 in an extension direction thereof. A particulate filter 82 that captures particulate matters contained in exhaust gas is mounted inside the downstream pipe 53. The particulate filter 82 is located rearward of the lower cross member 13 in the vehicle front-rear direction.

Figure 4A:
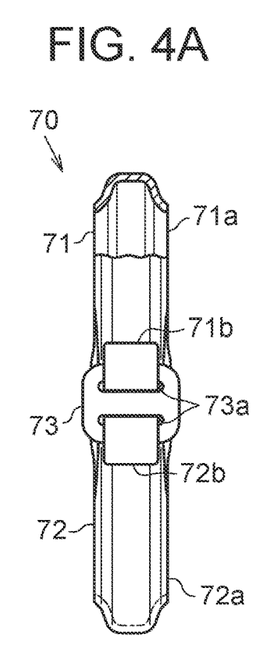
FIG. 4A is a side view of a clamp member.
Figure 4B:
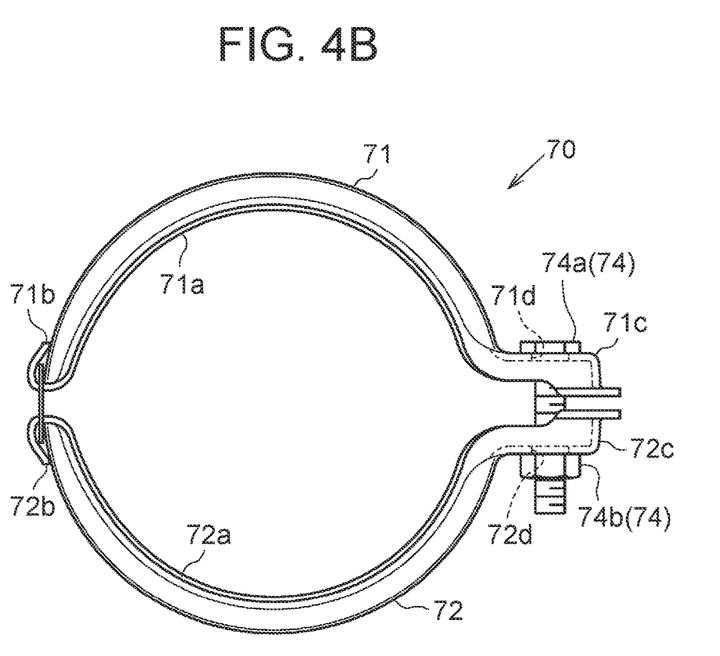
FIG. 4B is a front view of the clamp member.

The upstream end of the upstream pipe 52 of the first exhaust pipe 51 and the turbine section 43 of the turbocharger 40 are fixed to each other by a clamp member 70 having a ring shape as a whole. As shown in FIG. 4B, the clamp member 70 has a structure in which a substantially half-ring-shaped first fixing part 71 and a substantially half-ring-shaped second fixing part 72 are coupled together.

As shown in FIG. 4B, an arc portion 71a of the first fixing part 71 has a half-ring shape when seen from an axial direction of the clamp member 70. As shown in FIG. 4A, a cross section of the arc portion 71a orthogonal to an extension direction of the arc portion 71a has a substantially V-shape. As shown in FIG. 4B, a plate-shaped coupling portion 71b protrudes from one end of the arc portion 71a (the end on the left side in FIG. 4B), in a direction from the arc portion 71a toward a radially outer side. The coupling portion 71b is folded so as to extend along a circumferential direction of the arc portion 71a. A protruding portion 71c protrudes from the other end of the arc portion 71a (the end on the right side in FIG. 4B), in a direction from the arc portion 71a toward a radially outer side. A fastening hole 71d extends through the protruding portion 71c in a direction orthogonal to both the axial direction of the clamp member 70 and the direction of protrusion of the protruding portion 71c (in the up-down direction in FIG. 4B). The second fixing part 72 has the same shape as the first fixing part 71, and includes an arc portion 72a, a coupling portion 72b, and a protruding portion 72c through which a fastening hole 72d extends.

As shown in FIG. 4A, a plate-shaped turning part 73 is coupled to the coupling portion 71b of the first fixing part 71 and the coupling portion 72b of the second fixing part 72. Specifically, two slits 73a extend through the turning part 73 in a thickness direction of the turning part 73. The coupling portion 71*b* of the first fixing part 71 is passed through one of the two slits 73*a* so as to allow the first fixing part 71 to turn relative to the turning part 73. The coupling portion 72*b* of the second fixing part 72 is passed through the other one of the two slits 73*a* so as to allow the second fixing part 72 to turn relative to the turning part 73.

As shown in FIG. 4B, the protruding portion 71*c* of the first fixing part 71 and the protruding portion 72*c* of the second fixing part 72 are fastened together with a bolt 74*a* and a nut 74*b*. Specifically, the bolt 74*a* is passed through the fastening hole 71*d* of the protruding portion 71*c* and the fastening hole 72*d* of the protruding portion 72*c*. The nut 74*b* is screwed on a leading end side of the bolt 74*a*. The protruding portion 71*c* of the first fixing part 71 and the protruding portion 72*c* of the second fixing part 72 are fastened together by screw fastening so as to be held between a head of the bolt 74*a* and the nut 74*b*. Thus, in this embodiment, the bolt 74*a* and the nut 74*b* constitute a fastening part 74. As shown in FIG. 2, the clamp member 70 is mounted at the upstream end of the first exhaust pipe 51 such that the turning part 73 is located above the fastening part 74. In a state where the clamp member 70 is mounted on the first exhaust pipe 51, a flange at the upstream end of the first exhaust pipe 51 and a flange at the downstream end of the turbine section 43 are disposed inside the V-shapes formed by the arc portion 71*a* of the first fixing part 71 and the arc portion 72*a* of the second fixing part 72. In other words, the first exhaust pipe 51 and the turbine section 43 of the turbocharger 40 are fixed to each other, with the upstream end of the first exhaust pipe 51 and the downstream end of the turbine section 43 coupled together so as to be held by the clamp member 70. In this embodiment, a first exhaust passage 50 includes the exhaust manifold 36 on the left side in the vehicle width direction, the turbine section 43 on the left side in the vehicle width direction, the first exhaust pipe 51, and the clamp member 70 on the left side in the vehicle width direction. In this embodiment, the exhaust manifold 36 on the left side in the vehicle width direction and the turbine section 43 on the left side in the vehicle width direction correspond to the upstream-side exhaust pipe of the first exhaust passage 50, and the first exhaust pipe 51 corresponds to the downstream-side exhaust pipe of the first exhaust passage 50.

An upstream end of the upstream pipe 57 of the second exhaust pipe 56 and the downstream end of the turbine section 43 of the turbocharger 40 are fixed to each other by a clamp member 70. The clamp member 70 that fixes the second exhaust pipe 56 has the same configuration as the clamp member 70 that fixes the first exhaust pipe 51. In this embodiment, as shown in FIG. 3, the second exhaust passage 55 includes the exhaust manifold 36 on the right side in the vehicle width direction, the turbine section 43 on the right side in the vehicle width direction, the second exhaust pipe 56, and the clamp member 70 on the right side in the vehicle width direction. In this embodiment, the exhaust manifold 36 on the right side in the vehicle width direction and the turbine section 43 on the right side in the vehicle width direction correspond to the upstream-side exhaust pipe of the second exhaust passage 55, and the second exhaust pipe 56 corresponds to the downstream-side exhaust pipe of the second exhaust passage 55.

As shown in FIG. 2, a crash bracket 60 as a plate-shaped member is fixed to the upstream pipe 52 of the first exhaust pipe 51. The crash bracket 60 is fixed to the first exhaust pipe 51, at a portion rearward in the vehicle front-rear direction (downstream) of the catalytic converter 81.

Figure 5:
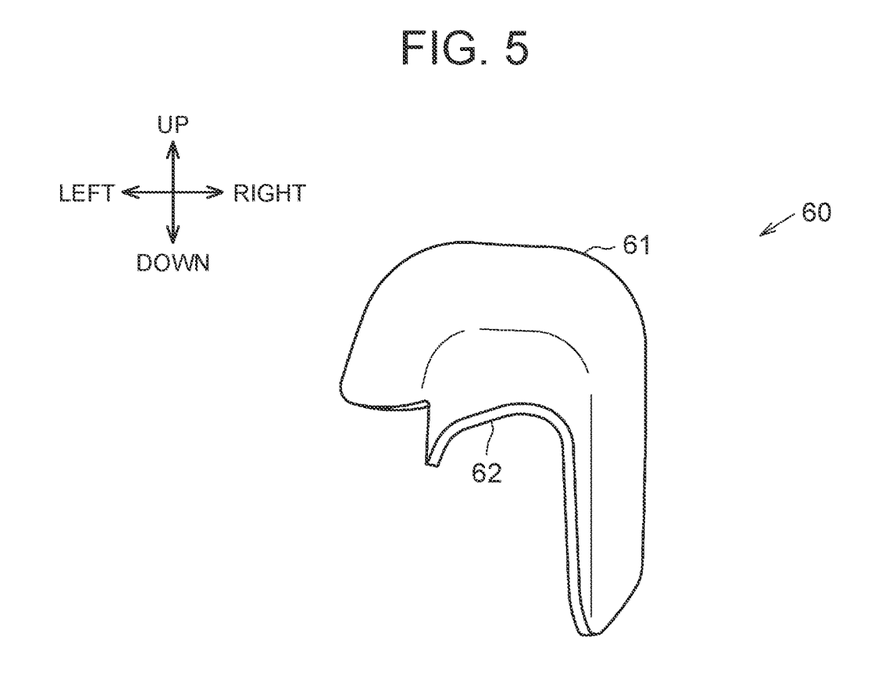
FIG. 5 is a front view of a crash bracket.

As shown in FIG. 5, the crash bracket 60 includes a fixing plate 61 that is curved so as to conform to the shape of an outer circumferential surface of the first exhaust pipe 51. The fixing plate 61 is curved so as to conform to the shape of a portion of the outer circumferential surface of the first exhaust pipe 51 on the upper side and the inner side in the vehicle width direction. An inner surface of a curved part of the fixing plate 61 is joined to the outer circumferential surface of the first exhaust pipe 51 by welding. A protruding plate 62 protrudes from a rear edge in the vehicle front-rear direction of the fixing plate 61 toward the rear side of the vehicle. The protruding plate 62 protrudes from the entire rear edge in the vehicle front-rear direction of the fixing plate 61. Thus, the protruding plate 62 of the crash bracket 60 has a curved shape in cross section orthogonal to the vehicle front-rear direction. The protruding plate 62 protrudes from the rear edge in the vehicle front-rear direction of the fixing plate 61 toward the lower cross member 13. An upper portion of the protruding plate 62 in the vehicle height direction is located at the same level as the lower cross member 13 in the vehicle height direction, and this portion of the protruding plate 62 and the lower cross member 13 face each other in the vehicle front-rear direction.

In this embodiment, the crash bracket 60 protrudes from the upstream pipe 52 of the first exhaust pipe 51 toward the lower cross member 13. Thus, the crash bracket 60 corresponds to a thrusting portion provided in the first exhaust passage 50. As shown in FIG. 2, an opposite region 13A of the lower cross member 13 that faces the protruding plate 62 of the crash bracket 60 in the vehicle front-rear direction corresponds to a thrust-receiving portion provided in the lower cross member 13.

Here, as shown in FIG. 2, the upstream pipe 52 of the first exhaust pipe 51 faces the dashboard panel 20 in the vehicle front-rear direction. Inside the engine compartment A, a distance X in the vehicle front-rear direction between the crash bracket 60 and the lower cross member 13 is shorter than a shortest distance Y in the vehicle front-rear direction between the dashboard panel 20 and a portion of the first exhaust pipe 51 that faces the dashboard panel 20. In this embodiment, the distance in the vehicle front-rear direction between a lower end of the dashboard panel 20 and the portion of the first exhaust pipe 51 that faces the dashboard panel 20 is the shortest distance Y.

As described above, the first exhaust pipe 51 is disposed so as to look like the second exhaust pipe 56 having been moved parallel toward the rear side of the vehicle when seen from the vehicle width direction. Accordingly, as shown in FIG. 3, a shortest distance Z in the vehicle front-rear direction between the dashboard panel 20 and a portion of the second exhaust pipe 56 that faces the dashboard panel 20 is longer than the shortest distance Y from the first exhaust pipe 51. Thus, inside the engine compartment A, the distance X in the vehicle front-rear direction between the crash bracket 60 and the lower cross member 13 is shorter than the shortest distance Z in the vehicle front-rear direction between the dashboard panel 20 and the portion of the second exhaust pipe 56 that faces the dashboard panel 20.

As shown in FIG. 3, a plate-shaped first connection bracket 66 is connected to the protruding plate 62 of the crash bracket 60. The first connection bracket 66 extends toward the transmission 91, and is fixed at an end to the transmission 91. This means that the first exhaust pipe 51 is supported also by the transmission 91 through the crash bracket 60 and the first connection bracket 66, so that vibration of the first exhaust pipe 51 is reduced. Thus, the crash bracket 60 functions not only as the thrusting portion but also to support the first exhaust pipe 51. A portion at which the protruding plate 62 of the crash bracket 60 and the transmission 91 are connected to each other through the first connection bracket 66 is configured to break under a smaller force (e.g., a several tens of times smaller force) from the front side of the vehicle than the portion at which the first exhaust pipe 51 and the turbine section 43 are fixed to each other.

A plate-shaped fixing bracket 65 is fixed to the upstream pipe 57 of the second exhaust pipe 56. The fixing bracket 65 is fixed such that, in the vehicle front-rear direction, a rear end of the fixing bracket 65 is located frontward of a rear end of the crash bracket 60. A plate-shaped second connection bracket 67 is connected to the fixing bracket 65. The second connection bracket 67 extends toward the transmission 91, and is fixed at an end to the transmission 91. This means that the second exhaust pipe 56 is supported also by the transmission 91 through the fixing bracket 65 and the second connection bracket 67, so that vibration of the second exhaust pipe 56 is reduced. A portion at which the fixing bracket 65 and the transmission 91 are connected to each other through the second connection bracket 67 is configured to break under a smaller force (e.g., a several tens of times smaller force) from the front side of the vehicle than the portion at which the second exhaust pipe 56 and the turbine section 43 are fixed to each other. A member corresponding to the crash bracket 60 mounted on the first exhaust pipe 51 is not mounted on the second exhaust pipe 56.

As described above, the steering wheel 92a of the steering 92 is disposed inside the vehicle cabin B, on the left side in the vehicle width direction. Thus, in a plan view of the vehicle, the distance in the vehicle width direction between the center of turning of the steering wheel 92a and the first exhaust pipe 51 of the first exhaust passage 50 is shorter than the distance in the vehicle width direction between the center of turning of the steering wheel 92a and the second exhaust pipe 56 of the second exhaust passage 55.

Figure 6A:
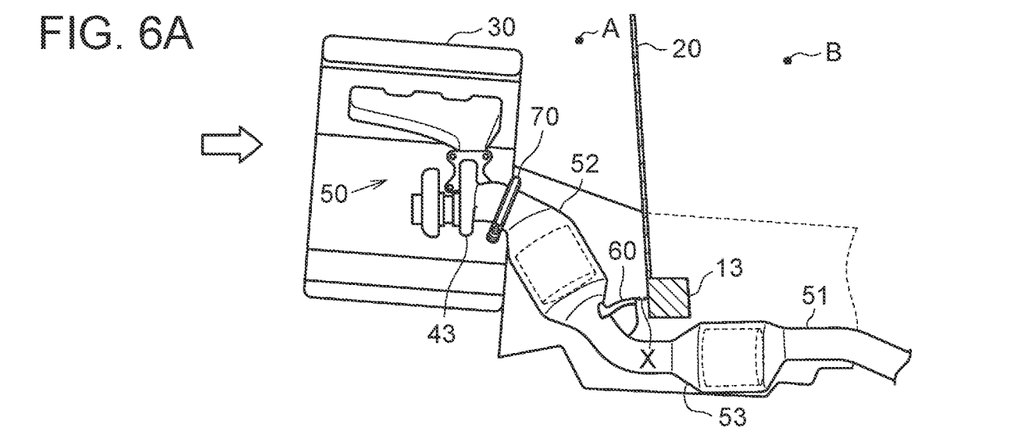
FIG. 6A is an illustration of the front-side part of the vehicle, showing a state before an internal combustion engine moves.

The workings and effects of this embodiment will be described. As shown in FIG. 6A, the internal combustion engine 30, the first exhaust passage 50, and the second exhaust passage 55 are disposed inside the engine compartment A, apart from the dashboard panel 20 and the lower cross members 13 in the vehicle front-rear direction. Here, at a frontal collision in which an object collides with the vehicle from the front side of the vehicle, the engine compartment A becomes crushed and the internal combustion engine 30 moves toward the rear side of the vehicle. When the internal combustion engine 30 thus moves rearward, the first exhaust passage 50 and the second exhaust passage 55 connected to the internal combustion engine 30 also move toward the rear side of the vehicle. From the viewpoint of reducing the force transmitted into the vehicle cabin B at a frontal collision, a space may be provided between the internal combustion engine 30 and the dashboard panel 20 to secure a crash stroke at a frontal collision.

Figure 6B:
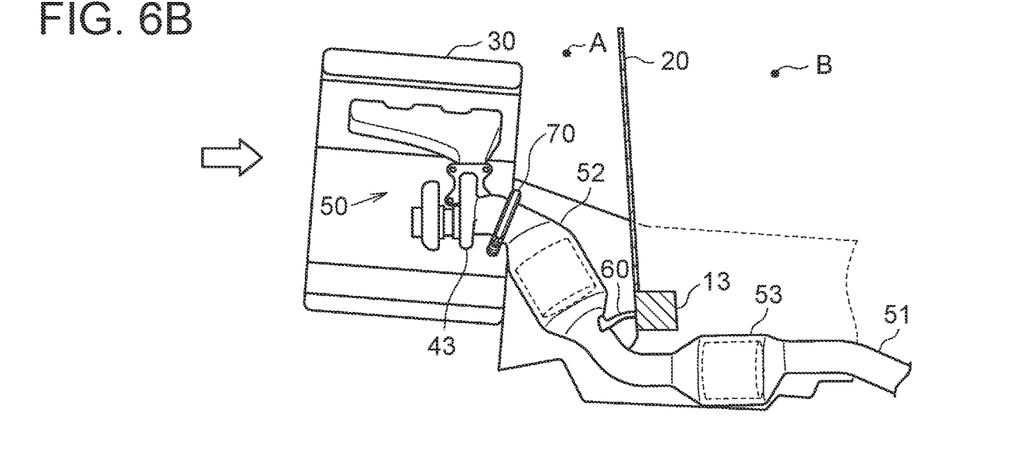
FIG. 6B is an illustration of the front-side part of the vehicle, showing how the internal combustion engine moves.

In this embodiment, the crash bracket 60 protrudes from the upstream pipe 52 of the first exhaust pipe 51 toward the lower cross member 13 as shown in FIG. 2. Therefore, as shown in FIG. 6B, the crash bracket 60 and the lower cross member 13 are highly likely to come into contact with each other when the internal combustion engine 30 moves rearward. Moreover, in this embodiment, inside the engine compartment A, the distance X in the vehicle front-rear direction between the crash bracket 60 and the lower cross member 13 is shorter than the shortest distance Y in the vehicle front-rear direction between the dashboard panel 20 and the portion of the first exhaust pipe 51 that faces the dashboard panel 20. Thus, when the internal combustion engine 30 moves rearward, the crash bracket 60 and the lower cross member 13 are especially highly likely to come into contact with each other. When the crash bracket 60 and the lower cross member 13 come into contact with each other, the first exhaust pipe 51 to which the crash bracket 60 is fixed is restrained from moving toward the rear side of the vehicle. On the other hand, the internal combustion engine 30 still tries to move toward the rear side of the vehicle, so that the force with which the internal combustion engine 30 tries to move toward the rear side of the vehicle acts on the portion at which the downstream end of the turbine section 43 and the upstream end of the first exhaust pipe 51 are fixed to each other. Since the turbocharger 40 is fixed to the internal combustion engine 30 as described above, this force is less likely to act on the portion at which a downstream end of the exhaust manifold 36 and an upstream end of the turbine section 43 are fixed to each other.

Here, the portion at which the upstream end of the first exhaust pipe 51 and the downstream end of the turbine section 43 are fixed to each other by the clamp member 70 constitutes a joint between two different members, and therefore fractures more easily under a force from the front side of the vehicle than other portions of the first exhaust passage 50. Thus, the first exhaust pipe 51 easily comes off and falls from the turbine section 43 at a frontal collision.

The fastening part 74 of the clamp member 70 is a part where the protruding portion 71c of the first fixing part 71 and the protruding portion 72c of the second fixing part 72 are fastened together by screw fastening of the bolt 74a and the nut 74b, and thus has relatively high strength. On the other hand, the turning part 73 of the clamp member 70 has a structure that enables the coupling portion 71b of the first fixing part 71 and the coupling portion 72b of the second fixing part 72 to turn and therefore has low strength. Specifically, the slits 73a through which the coupling portion 71b of the first fixing part 71 and the coupling portion 72b of the second fixing part 72 are inserted extend through the plate-shaped turning part 73, which makes the turning part 73 a structure relatively prone to deformation or shearing. Thus, the turning part 73 of the clamp member 70 has lower strength and breaks more easily under a force from the front side of the vehicle than the fastening part 74 of the clamp member 70.

Figure 6C:
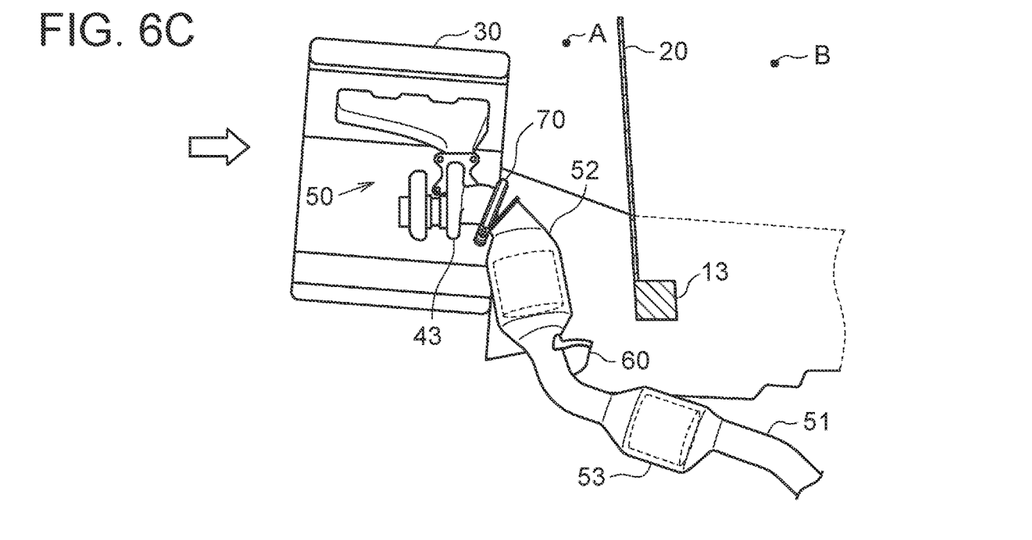
FIG. 6C is an illustration of the front-side part of the vehicle, showing how the internal combustion engine moves.

The crash bracket 60 is located below the clamp member 70 in the vehicle height direction. Therefore, when a force acts on the first exhaust passage 50 in a direction from the internal combustion engine 30 toward the rear side of the vehicle, this force acts so as to separate an upper side of the portion at which the first exhaust pipe 51 and the turbine section 43 are fixed to each other, with a lower side of this fixed portion serving as a supporting point. The turning part 73 located on the upper side in the clamp member 70 breaks as such a force acts on the turning part 73, so that, as shown in FIG. 6C, the upstream end of the first exhaust pipe 51 comes off the turbine section 43 and the first exhaust pipe 51 falls. In this way, in this embodiment, the portion at which the upstream end of the first exhaust pipe 51 and the downstream end of the turbine section 43 are fixed to each other is allowed to fracture more reliably so as to cause the first exhaust pipe 51 to fall at a collision of the vehicle. Thus, in this embodiment, the portion at which the downstream end of the turbine section 43 and the upstream end of the first exhaust pipe 51 are fixed to each other functions as a fragile portion that fractures easily under a force from the front side of the vehicle.

In this embodiment, inside the engine compartment A, the distance X in the vehicle front-rear direction between the crash bracket 60 and the lower cross member 13 is shorter than the shortest distance Z in the vehicle front-rear direction between the dashboard panel 20 and the portion of the second exhaust pipe 56 that faces the dashboard panel 20. Thus, when the internal combustion engine 30 moves toward the rear side of the vehicle, the second exhaust pipe 56 is highly likely to come into contact with the dashboard panel 20 etc. after the crash bracket 60 and the lower cross member 13 come into contact with each other. In other words, this embodiment allows the first exhaust pipe 51 to come into contact with the lower cross member 13 and the second exhaust pipe 56 to come into contact with the dashboard panel 20 etc. at different timings. When the first exhaust pipe 51 and the second exhaust pipe 56 thus come into contact with the lower cross member 13 and the dashboard panel 20 etc., respectively, at different timings, an impact exerted on the vehicle when the first exhaust pipe 51 comes into contact with the lower cross member 13 and an impact exerted on the vehicle when the second exhaust pipe 56 comes into contact with the dashboard panel 20 etc. are less likely to occur at the same time. Thus, compared with when the first exhaust pipe 51 and the second exhaust pipe 56 come into contact with the lower cross member 13 etc. at the same time, this embodiment can reduce a maximum impact force exerted on the vehicle by the first exhaust pipe 51 and the second exhaust pipe 56 coming into contact with the lower cross member 13 etc. Since the second exhaust pipe 56 comes into contact with the dashboard panel 20 etc. after the crash bracket 60 and the lower cross member 13 come into contact with each other as described above, the likelihood of significant deformation of the dashboard panel 20, even when the second exhaust pipe 56 comes into contact with the dashboard panel 20, can be reduced.

In this embodiment, the rearmost cylinder 33a of the three cylinders 33a on the left side in the vehicle width direction is located rearward of the rearmost cylinder 33b of the three cylinders 33b on the right side in the vehicle width direction. To match such positions of the cylinders 33a and the cylinders 33b, the portion at which the cylinder head 32 of the internal combustion engine 30 and the exhaust manifold 36 of the first exhaust passage 50 are fixed to each other is located rearward in the vehicle front-rear direction of the portion at which the cylinder head 32 of the internal combustion engine 30 and the exhaust manifold 36 of the second exhaust passage 55 are fixed to each other. Accordingly, the shortest distance Y in the vehicle front-rear direction between the dashboard panel 20 and the portion of the first exhaust pipe 51 that faces the dashboard panel 20 is shorter than the shortest distance Z in the vehicle front-rear direction between the dashboard panel 20 and the portion of the second exhaust pipe 56 that faces the dashboard panel 20. In such a configuration, a distance between the internal combustion engine 30 on one side and the dashboard panel 20 and the lower cross member 13 on the other side may be secured and may allow the first exhaust pipe 51 to fall reliably at a frontal collision.

Here, in a plan view of the vehicle, the distance in the vehicle width direction between the center of turning of the steering wheel 92a and the first exhaust pipe 51 of the first exhaust passage 50 is shorter than the distance in the vehicle width direction between the center of turning of the steering wheel 92a and the second exhaust pipe 56 of the second exhaust passage 55. If the first exhaust pipe 51 located on the left side in the vehicle width direction comes into contact with the dashboard panel 20, a portion of the dashboard panel 20 on the left side in the vehicle width direction may deform significantly. If the portion of the dashboard panel 20 in the vicinity of the steering wheel 92a thus deforms significantly, this portion may come into contact with surrounding structures, such as the steering wheel 92a and the steering shaft 92b of the steering 92, and thereby cause damage to these structures.

This embodiment allows the first exhaust pipe 51 on the left side in the vehicle width direction to fall reliably at a collision of the vehicle. Thus, the likelihood that the first exhaust pipe 51 may come into contact with the portion of the dashboard panel 20 in the vicinity of the steering wheel 92a can be reduced. As a result, damage to the surrounding structures, such as the steering wheel 92a and the steering shaft 92b of the steering 92, that results from deformation of the portion of the dashboard panel 20 in the vicinity of the steering wheel 92a can be more reliably reduced.

The catalytic converter 81 is mounted inside the upstream pipe 52 of the first exhaust pipe 51. Thus, the portion of the first exhaust pipe 51 at which the catalytic converter 81 is mounted is heavier than other portions of the first exhaust pipe 51. If the portion of the first exhaust pipe 51 at which the catalytic converter 81 is mounted comes into contact with the dashboard panel 20, the portion of the dashboard panel 20 on the left side in the vehicle width direction may deform significantly and cause damage to the steering 92 etc.

As described above, this embodiment allows the portion at which the upstream end of the first exhaust pipe 51 and the turbine section 43 are fixed to each other to fracture more reliably at a collision of the vehicle. Since the catalytic converter 81 is mounted rearward of the upstream end of the first exhaust pipe 51 in the vehicle front-rear direction, the first exhaust pipe 51 is allowed to fall toward the lower side of the vehicle more reliably due to the weight of the catalytic converter 81 after the portion at which the upstream end of the first exhaust pipe 51 and the turbine section 43 are fixed to each other fractures. Since the first exhaust pipe 51 is thus allowed to fall toward the lower side of the vehicle more reliably, the first exhaust pipe 51 is unlikely to come into contact with the dashboard panel 20. As a result, damage to the steering 92 etc. attributable to deformation of the dashboard panel 20 due to the first exhaust pipe 51 coming into contact with the dashboard panel 20 can be reduced.

In this embodiment, the protruding plate 62 of the crash bracket 60 has a curved shape in cross section orthogonal to the vehicle front-rear direction. Accordingly, the protruding plate 62 of the crash bracket 60 has high rigidity against a force acting in the vehicle front-rear direction. Therefore, when the crash bracket 60 and the lower cross member 13 come into contact with each other, a force from the front side of the vehicle is hardly absorbed by deformation of the crash bracket 60. Thus, the force from the front side of the vehicle can be more reliably exerted on the first exhaust pipe 51 when the crash bracket 60 and the lower cross member 13 come into contact with each other.

This embodiment can be implemented with changes made thereto as described below. The embodiment and the following modified examples can be implemented in combination within such a range that no technical inconsistency arises. —The distance X in the vehicle front-rear direction between the crash bracket 60 and the lower cross member 13 in the above embodiment can be changed. For example, the distance X in the vehicle front-rear direction between the crash bracket 60 and the lower cross member 13 may be equal to the shortest distance Y in the vehicle front-rear direction between the dashboard panel 20 and the portion of the first exhaust pipe 51 that faces the dashboard panel 20.

Also in this case, if the crash bracket 60 and the lower cross member 13 come into contact with each other, the portion at which the upstream end of the first exhaust pipe 51 and the turbine section 43 are fixed to each other is allowed to fracture more reliably so as to cause the first exhaust pipe 51 to fall at a collision of the vehicle. Alternatively, the distance X in the vehicle front-rear direction between the crash bracket 60 and the lower cross member 13 may be longer than the shortest distance Y in the vehicle front-rear direction between the dashboard panel 20 and the portion of the first exhaust pipe 51 that faces the dashboard panel 20. Also in this case, compared with a configuration from which the crash bracket 60 is omitted, the portion at which the upstream end of the first exhaust pipe 51 and the turbine section 43 are fixed to each other is allowed to fracture easily at a collision of the vehicle because the crash bracket 60 and the lower cross member 13 come into contact with each other.

In the above embodiment, a support bracket that supports the first exhaust pipe 51 onto the transmission 91 may be fixed to the first exhaust pipe 51. In this case, the crash bracket 60 need not be fixed to the transmission 91 through the first connection bracket 66.

Figure 7:
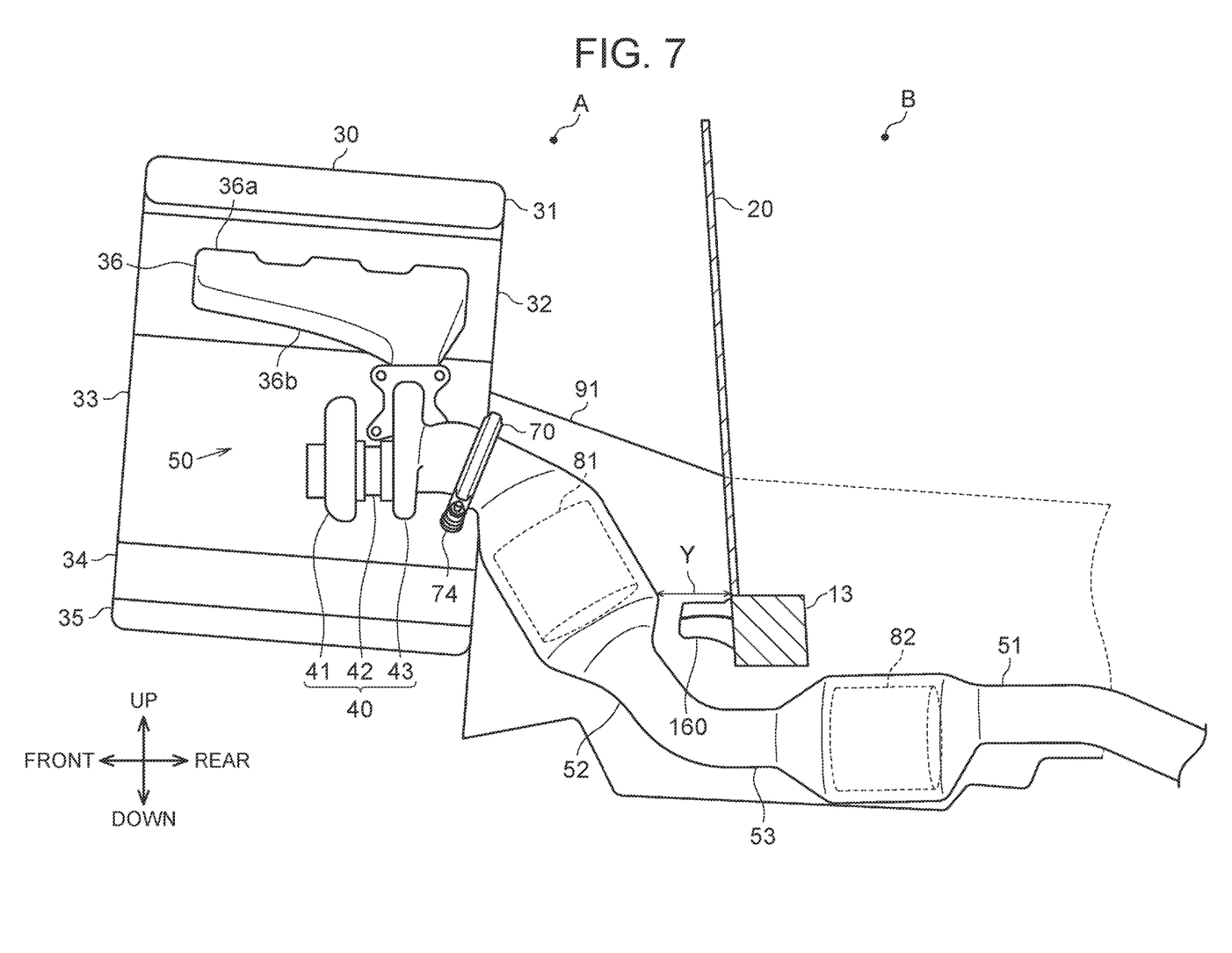
FIG. 7 is a side view of a front-side part of a vehicle in a modified example.

The crash bracket 60 may be omitted from the above embodiment. The crash bracket 60 may be omitted, for example, if a crash member 160 protrudes from the lower cross member 13 toward the first exhaust pipe 51 and faces the first exhaust pipe 51 in the vehicle front-rear direction as shown in FIG. 7. In this case, the crash member 160 functions as the thrusting portion. A region of the first exhaust pipe 51 that faces the crash member 160 in the vehicle front-rear direction functions as the thrust-receiving portion provided in the first exhaust pipe 51. When the crash member 160 functions as the thrusting portion, inside the engine compartment A, the distance in the vehicle front-rear direction between the crash member 160 and the first exhaust pipe 51 may be equal to or shorter than the shortest distance Y in the vehicle front-rear direction between the dashboard panel 20 and the portion of the first exhaust pipe 51 that faces the dashboard panel 20.

In the above embodiment, a crash bracket similar to the crash bracket 60 fixed to the first exhaust pipe 51 may be fixed to the second exhaust pipe 56. In this case, the crash bracket fixed to the second exhaust pipe 56 functions as the thrusting portion. As in the above-described modified example, a crash member may protrude from the lower cross member 13 toward the second exhaust pipe 56.

The thrusting portion in the above embodiment is not limited to the crash bracket 60; depending on the shape or the fixing position of the fixing bracket 65 of the second exhaust pipe 56, the fixing bracket 65 can function as the thrusting portion. The fixing bracket functions as the thrusting portion, for example, when the fixing bracket protrudes from the second exhaust pipe 56 toward the lower cross member 13 and faces the lower cross member 13 in the vehicle front-rear direction. In this case, inside the engine compartment A, the distance in the vehicle front-rear direction between the fixing bracket and the lower cross member 13 may be equal to or shorter than the shortest distance Z in the vehicle front-rear direction between the dashboard panel 20 and the portion of the second exhaust pipe 56 that faces the dashboard panel 20.

In the above embodiment, the thrust-receiving portion may be provided in a framework member other than the lower cross member 13. For example, when the crash bracket 60 protrudes from the first exhaust pipe 51 toward the lower pillar 14b on the outer side in the vehicle width direction and a portion of the crash bracket 60 faces the lower pillar 14b in the vehicle front-rear direction, this portion of the lower pillar 14b functions as the thrust-receiving portion. Thus, depending on the fixing position and the direction of protrusion of the crash bracket 60, framework members of the frame structure of the vehicle that support the dashboard panel 20, namely, the lower cross members 13, the lower pillars 14b, and the upper cross member 15, can function as the thrust-receiving portion.

In the above embodiment, the number of the exhaust passages connected to the internal combustion engine 30 can be changed. For example, the number of the exhaust passages may be one when the internal combustion engine is not a V-engine but an inline engine. —In the above embodiment, the configurations of the first exhaust passage 50 and the second exhaust passage 55 connected to the internal combustion engine 30 can be modified. For example, in a vehicle that is not equipped with the turbocharger 40, the upstream end of the first exhaust pipe 51 may be fixed to the downstream end of the exhaust manifold 36 on the left side in the vehicle width direction. In this case, the portion at which the downstream end of the exhaust manifold 36 on the left side in the vehicle width direction and the upstream end of the first exhaust pipe 51 are fixed to each other can function as the fragile portion that fractures easily under a force from the front side of the vehicle. Alternatively, for example, an upstream end of another exhaust pipe may be fixed to the downstream end of the first exhaust pipe 51. The second exhaust passage 55 can be modified in the same manner.

In the above embodiment, the thrusting portion may be provided only in the second exhaust passage 55 of which the portion fixed to the internal combustion engine 30 is located frontward of that of the first exhaust passage 50 in the vehicle front-rear direction. Specifically, for example, the crash bracket 60 of the first exhaust pipe 51 may be omitted, and a crash bracket may be fixed to the second exhaust pipe 56.

In the above embodiment, the position of the steering wheel 92a of the steering 92 inside the vehicle cabin B can be changed. For example, the steering wheel 92a of the steering 92 may be disposed inside the vehicle cabin B, on the right side in the vehicle width direction. This means that in this configuration, in a plan view of the vehicle, the distance in the vehicle width direction between the center of turning of the steering wheel 92a and the second exhaust pipe 56 of the second exhaust passage 55 may be shorter than the distance in the vehicle width direction between the center of turning of the steering wheel 92a and the first exhaust pipe 51 of the first exhaust passage 50.

In the above embodiment, the portion at which the downstream end of the turbine section 43 and the upstream end of the first exhaust pipe 51 are fixed to each other can function as the fragile portion, regardless of the direction of mounting of the clamp member 70. For example, even when the clamp member 70 is mounted such that the turning part 73 is located below the fastening part 74, the portion at which the downstream end of the turbine section 43 and the upstream end of the first exhaust pipe 51 are fixed to each other constitutes the fragile portion if this fixed portion fractures more easily than other portions of the first exhaust passage 50.

The turbine section 43 of the turbocharger 40 and the first exhaust pipe 51 may be connected to each other by a structure other than the clamp member 70. For example, the turbine section 43 and the first exhaust pipe 51 may be connected to each other by joining the two together by welding. Also in this case, the portion at which the downstream end of the turbine section 43 and the upstream end of the first exhaust pipe 51 are fixed to each other is a portion where two different members are connected to each other, and therefore fractures easily. Thus, the portion at which the downstream end of the turbine section 43 and the upstream end of the first exhaust pipe 51 are fixed to each other can function as the fragile portion.

In the above embodiment, the position of the fragile portion in the first exhaust passage 50 can be changed. For example, it is also possible to make the thickness of a wall of the first exhaust pipe 51 thinner at a portion frontward of the catalytic converter 81 in the vehicle front-rear direction than the thickness at other portions such that this portion of the first exhaust pipe 51 frontward of the catalytic converter 81 in the vehicle front-rear direction functions as the fragile portion of the first exhaust passage 50.

In the above embodiment, the position of the catalytic converter 81 inside the first exhaust pipe 51 can be changed. For example, the catalytic converter 81 may be mounted inside the downstream pipe 53 of the first exhaust pipe 51, at a portion frontward of the particulate filter 82 in the vehicle front-rear direction. Alternatively, the catalytic converter 81 can be omitted.

In the above embodiment, the shape of the crash bracket 60 can be changed. For example, the protruding plate 62 of the crash bracket 60 may have a bent shape or a flat plate shape in cross section orthogonal to the vehicle front-rear direction. Moreover, the protruding plate 62 may have a columnar shape. Whatever shape the protruding plate 62 may have, the first exhaust passage 50 is to some extent restrained from moving toward the rear side of the vehicle when the protruding plate 62 comes into contact with the lower cross member 13.

The embodiment of the present disclosure is summarized as follows. A portion at which a downstream end of a turbine section (43) of a turbocharger (40) and an upstream end of a first exhaust pipe (51) are fixed to each other is configured as a fragile portion that fractures easily under a force from a front side of a vehicle. A crash bracket (60) serving as a thrusting portion protruding toward a lower cross member (13) that is part of a frame structure of the vehicle and supports a dashboard panel (20), is fixed to the first exhaust pipe (51), at a portion frontward of the dashboard panel (20) and rearward of the fragile portion in a vehicle front-rear direction. The lower cross member (13) is provided with a thrust-receiving portion that comes into contact with the crash bracket (60) when the first exhaust pipe (51) moves toward a rear side of the vehicle.

What is claimed is:

1. A vehicle comprising:
   a plate-shaped dashboard panel serving as a partition between an engine compartment in which an internal combustion engine is installed and a vehicle cabin located rearward of the engine compartment in a vehicle front-rear direction;
   a first exhaust passage fixed to the internal combustion engine and extending from the internal combustion engine toward a rear side of the vehicle, the first exhaust passage having a fragile portion provided at a position frontward of the dashboard panel in the vehicle front-rear direction, the fragile portion fracturing more easily under a force from a front side of the vehicle than other portions of the first exhaust passage; and
   a thrusting portion provided in one of the first exhaust passage, at a position frontward of the dashboard panel and rearward of the fragile portion in the vehicle front-rear direction, and a framework member that is part of a frame structure of the vehicle and supports the dashboard panel, the thrusting portion protruding from the one of the first exhaust passage and the framework member toward the other one and facing the other one in the vehicle front-rear direction.

2. The vehicle according to claim 1, further comprising a thrust-receiving portion that is provided in the other one of the first exhaust passage, at a position frontward of the dashboard panel and rearward of the fragile portion in the vehicle front-rear direction, and the framework member, the thrusting portion coming into contact with the thrust-receiving portion when the first exhaust passage moves toward the rear side of the vehicle,
   wherein, inside the engine compartment, a distance in the vehicle front-rear direction between the thrusting portion and the thrust-receiving portion is equal to or shorter than a shortest distance in the vehicle front-rear direction between the dashboard panel and a portion of the first exhaust passage that faces the dashboard panel in the vehicle front-rear direction.

3. The vehicle according to claim 2, further comprising a second exhaust passage,
   wherein, the first exhaust passage located on one side in a vehicle width direction and the second exhaust passage located on the other side in the vehicle width direction,
   the second exhaust passage is fixed to the internal combustion engine and extends from the internal combustion engine toward the rear side of the vehicle, and
   inside the engine compartment, a distance in the vehicle front-rear direction between the thrusting portion and the thrust-receiving portion is shorter than a shortest distance in the vehicle front-rear direction between the dashboard panel and a portion of the second exhaust passage that faces the dashboard panel in the vehicle front-rear direction.

4. The vehicle according to claim 3, wherein a portion at which the first exhaust passage is fixed to the internal combustion engine is located rearward in the vehicle front-rear direction of a portion at which the second exhaust passage is fixed to the internal combustion engine.

5. The vehicle according to claim 3, further comprising a steering wheel which is mounted inside the vehicle cabin and by which the vehicle is steered, wherein, in a plan view of the vehicle, a distance in a vehicle width direction between a center of turning of the steering wheel and the first exhaust passage is shorter than a distance in the vehicle width direction between the center of turning of the steering wheel and the second exhaust passage.

6. The vehicle according to claim 1, wherein
   the first exhaust passage includes an upstream-side exhaust pipe located on an upstream side, a downstream-side exhaust pipe located on a downstream side, and a ring-shaped clamp member that fixes a downstream end of the upstream-side exhaust pipe and an upstream end of the downstream-side exhaust pipe to each other in a state of being coupled together,
   the thrusting portion is located below the clamp member in a vehicle height direction,
   the clamp member includes a half-ring-shaped first fixing part, a half-ring-shaped second fixing part, a turning part that turnably couples together the first fixing part and the second fixing part at ends on one side, and a fastening part that fastens together the first fixing part and the second fixing part at ends on the other side by screw fastening, the turning part is located above the fastening part in the vehicle height direction, and the fragile portion is a portion at which the downstream end of the upstream-side exhaust pipe and the upstream end of the downstream-side exhaust pipe are fixed to each other.

7. The vehicle according to claim 1, wherein a catalytic converter that reduces pollutants in exhaust gas is mounted inside the first exhaust passage, at a position frontward of the dashboard panel and rearward of the fragile portion.

8. The vehicle according to claim 1, wherein the thrusting portion is a plate-shaped member having a curved or bent shape in cross section orthogonal to the vehicle front-rear direction.

\* \* \* \* \*